United States Patent [19]
Filipovich et al.

[11] Patent Number: 5,628,543
[45] Date of Patent: May 13, 1997

[54] VEHICLE SEAT BACK HAVING SKI TOTE BAG AND TRUNK PASS THROUGH

[75] Inventors: Michael Filipovich, Farmington Hills; Terry L. Long, South Lyon; Dennis R. Baker, Novi, all of Mich.

[73] Assignee: Hoover Universal, Inc., Plymouth, Mich.

[21] Appl. No.: 534,873

[22] Filed: Sep. 27, 1995

[51] Int. Cl.⁶ ........................................................ B60R 5/00
[52] U.S. Cl. .................... 297/113; 297/188.14; 296/37.1
[58] Field of Search .......................... 297/113, 188.01, 297/188.14, 188.13; 220/670, 672; 224/497, 510, 517; 296/37.1, 37.15

[56] References Cited

U.S. PATENT DOCUMENTS 4,973,017  11/1990  Takagi .................................. 297/113 X

FOREIGN PATENT DOCUMENTS

| 3003430 | 8/1981 | Germany | 296/37.1 |
| 3400143 | 7/1985 | Germany | 296/37.1 |
| 3419758 | 11/1985 | Germany | 296/37.1 |
| 4017911 | 12/1991 | Germany | 220/672 |
| 4072187 | 3/1992 | Japan | 220/672 |
| 438052 | 11/1967 | Switzerland | 296/37.1 |

*Primary Examiner*—Peter R. Brown
*Attorney, Agent, or Firm*—Harness, Dickey & Pierce, P.L.C.

[57] ABSTRACT

A ski tote bag is provided for a motor vehicle seat back in which, when the armrest is deployed, a recess is formed in the seat back. The rear wall of the recess can be moved, revealing a pass through into a vehicle trunk. Alternatively, the rear wall can be separated into front and rear panels which are connected together by an extendable ski tote bag which folds in an accordion-style fashion. With the ski tote extended, elongated objects such as skis can be inserted into the tote bag from the trunk and stored within the trunk and rear portion of the vehicle passenger compartment while protecting the interior of the vehicle from dirt, snow and other debris carried by the skis.

18 Claims, 5 Drawing Sheets

VEHICLE SEAT BACK HAVING SKI TOTE BAG AND TRUNK PASS THROUGH

BACKGROUND AND SUMMARY OF THE INVENTION

The invention relates generally to a vehicle seat back having a ski tote bag and in particular to a seat back which provides a tote bag that is removably mounted to the seat back.

One common method of transporting skis with a vehicle is to attach the skis to the vehicle with an exteriorly mounted ski rack. The use of an exteriorly mounted ski rack poses a security problem because the skis can be removed from the rack by breaking the lock provided with the rack. As a result, many skiers wish to transport their skis in the vehicle trunk but are prevented from doing so due to the length of the skis which are typically too long to fit within the vehicle trunk.

Many motor vehicles are equipped with rear bench seats that have a seat back with a fold down panel. When the panel is folded down, access is provided from the trunk into the vehicle passenger compartment and visa versa. With the seat back panel folded down, it is possible to put skis in a vehicle trunk with the skis extending into the back seat area of the vehicle. However, dirt, snow and other debris carried by the skis can soil the vehicle interior. Furthermore, the skis are visible through the vehicle windows. Some seat manufacturers have provided a ski tote bag in the seat back. The tote bag extends into the passenger compartment with the skis contained in the tote bag to protect the vehicle interior and to conceal the skis from view. However, ski tote bags like this have no provision for access between the passenger compartment and the trunk. The opening through the seat back is confined by the ski tote bag.

Accordingly, it is one object of the present invention to provide a ski tote bag in a vehicle seat back which also contains a pass through between the passenger compartment and the trunk.

It is a further object to provide a tote bag and a pass through using a common opening in the seat back.

It is another object of the invention to provide a ski tote bag which is folded into a thin package for storage in the seat back but which can be extended sufficiently to use with long skis.

Since the inside of the tote bag can collect dirt and debris from the skis as well as snow and moisture, it is also an object of the present invention to enable the tote bag to be removed from the seat back for thorough cleaning.

In one embodiment, the seat back of the present invention contains a foam body forming a seat back cushion having a front surface against which a seat occupant rests his or her torso. A recess is formed in the foam pad and extends rearward into the seat back behind the seating surface. An armrest cushion is stowed in the recess and is movable from the recess to a forwardly extending use position for use of the armrest. In the armrest use position, the recess in the seat back is revealed. The rear wall of the recess is pivotally mounted to the seat back. The rear wall is movable from a position closing the recess and an open position extending forward from the recess, and resting upon the armrest. In the open position, a passage into the trunk is revealed. In a preferred embodiment, a lock is also provided for locking the rear wall in the closed position to prevent unauthorized access into the trunk.

The rear wall has front and rear panels which are removably coupled to one another. The rear panel is retained on the seat back by the lock. There is a latch to retain the front panel on the rear panel. The rear panel includes an opening into the trunk which is surrounded by a flexible and an extendable bag attached to the rear panel. The opposite end of the bag is connected to the front panel. As a result, when the front panel is removed from the rear panel, it can be moved forward into the passenger compartment, extending the ski tote bag between the front and rear panels. Since the rear panel has an opening into the trunk, the skis can be inserted into the tote bag through the opening. If it is desirable to open the passage into the trunk as opposed to using the ski tote bag, the entire rear wall of the recess is unlocked and rotated to an open position providing access into the trunk. A number of ways can be used to removably mount the bag to the rear panel.

In another embodiment, the rear wall of the recess is formed in a frame member which is a part of the seat back support structure. The opening through the seat back is formed in the frame member. The tote bag is removably mounted to the seat back frame member about the perimeter of the opening. Again, the tote bag can be attached to the seat back in a variety of ways as disclosed below.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
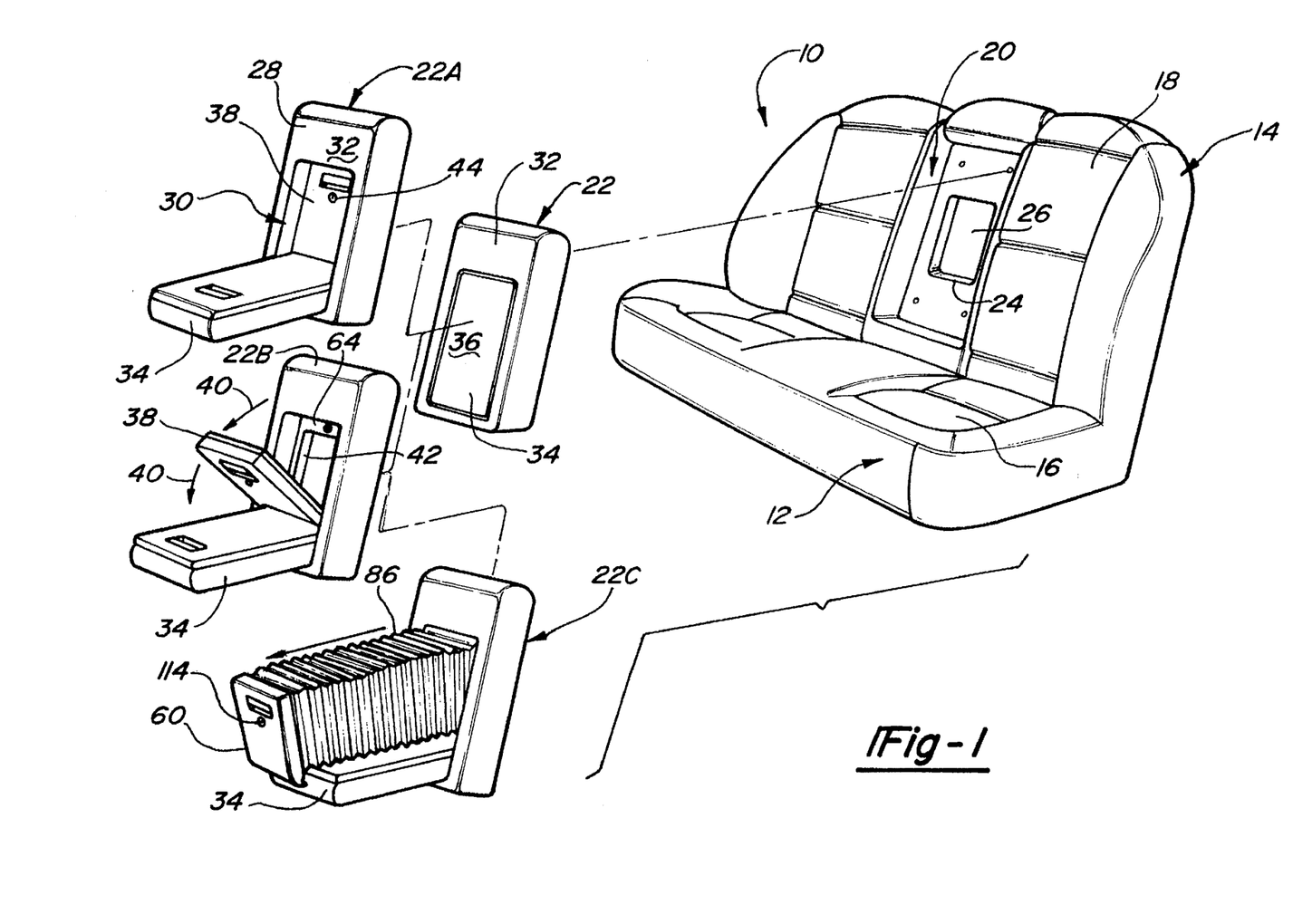
FIG. 1 is an exploded perspective view of the seat back of the present invention illustrating various positions of the seat components.

The seat assembly 10 shown in FIG. 1 includes a seat back having a ski tote bag and pass through according to the present invention. The seat assembly 10 is a rear bench seat for a motor vehicle having a rear trunk. The seat assembly 10 includes a lower seat cushion 12 and a generally upright seat back 14. The seat cushion 12 provides a generally horizontal seating surface 16 while the seat back provides an upright seating surface 18 against which a seat occupant rests his or her torso. As shown in FIG. 1, the seat back 14 includes a center cavity 20. The cavity 20 receives a module 22 which contains the armrest and ski tote bag as described below. The module 22 may be removed from the seat back 14 and replaced with other modules such as a child seat module. Interchangeable seat modules of this type are further described in pending application Ser. No. 08/412,134, filed Mar. 28, 1995, the specification of which is hereby incorporated by reference.

The module 22 includes an armrest and a ski tote bag as described in detail below. In FIG. 1, the module 22 is shown in three different configurations and labeled as 22A, 22B and 22C.

The seat back 14 includes a passage 24 which extends through the seat back support structure and into the trunk area 26 of a motor vehicle behind the seat back. The module 22 covers the passage 24 when it is placed within the cavity 20. The module 22 is formed of one or more foam bodies 28 and contains a recess 30 therein. The foam bodies 28 have a front surface 32 which forms a part of the seat back seating surface 18. An armrest 34 is rotatably mounted to the module. The armrest 34 has a stowed position within the recess 30 such that a front surface 36 of the armrest forms a part of the seat back seating surface. The armrest 34 is rotatable to a forward extending use position shown by the module 22A of FIG. 1. With the armrest in the use position, a seat occupant positioned on either side of the armrest can use the armrest 34 for support.

When the armrest is in its use position, the recess 30 is revealed. There is a rear wall 38 at the back of the recess. The rear wall 38 is rotatably mounted such that it can be rotated from its closed position forming the back of the recess 30 to a forwardly extending open position upon the armrest 34. The rear wall 38 is rotated forwardly and downwardly as shown by arrows 40 in connection with module 22B of FIG. 1. When the rear wall is in the open position, an opening 42 in the module 22 is exposed and is aligned with the passage 24 in the seat back.

Figures 2, 3:
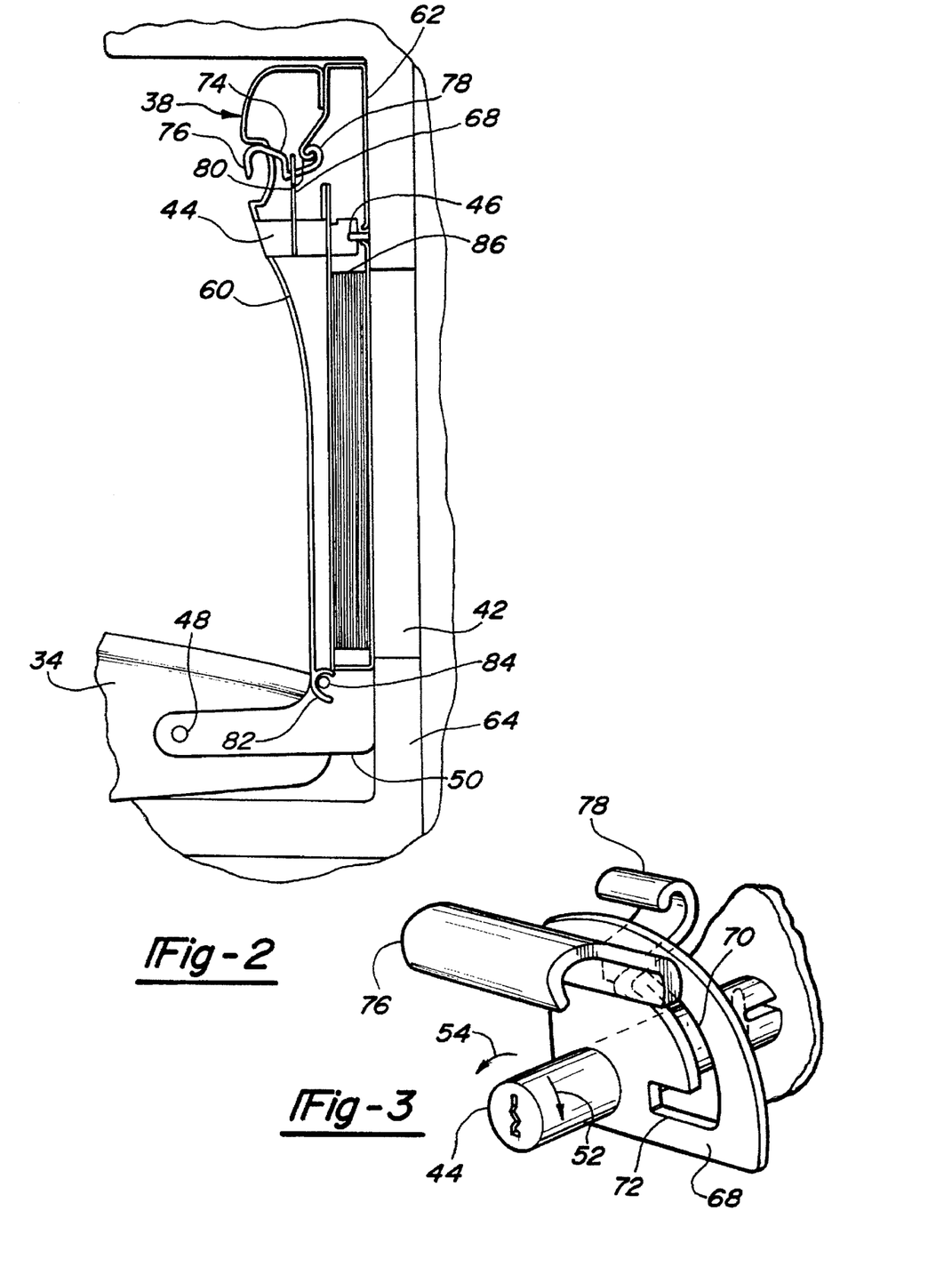
FIG. 2 is a side sectional view of the seat back recess rear wall.
FIG. 3 is a perspective view of the lock and latch structure.

A pass through between the trunk and passenger compartment is now open. A lock 44 locks the rear wall in the closed position by attaching the rear wall to a striker 46 (FIG. 2). Both the rear wall 38 and the armrest 34 pivot about a common axis defined by a pivot 48. The rear wall 38 includes a pair of brackets 50, one bracket on each side, which are coupled to the pivot 48. As mentioned previously, the rear wall 38 includes the lock 44 which couples the rear wall at its upper end to the striker 46, thus holding the rear wall in place. Rotation of the lock in a clockwise direction as shown by the arrow 52 (FIG. 3) results in release of the lock from the striker 46, enabling the rear wall 38 to be rotated to its open position and open the pass through.

Figure 4:
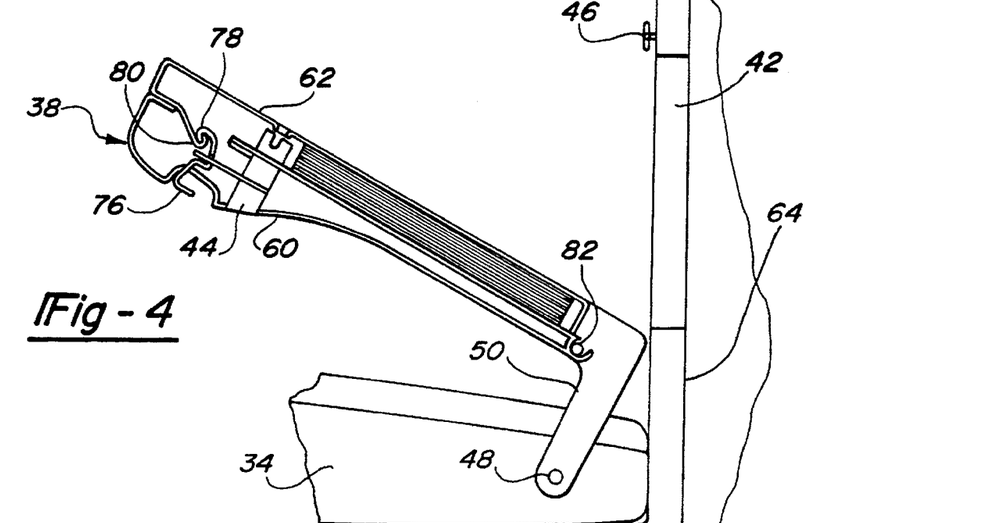
FIG. 4 is a sectional view similar to FIG. 2 illustrating the rear wall in an open position.
Figure 5:
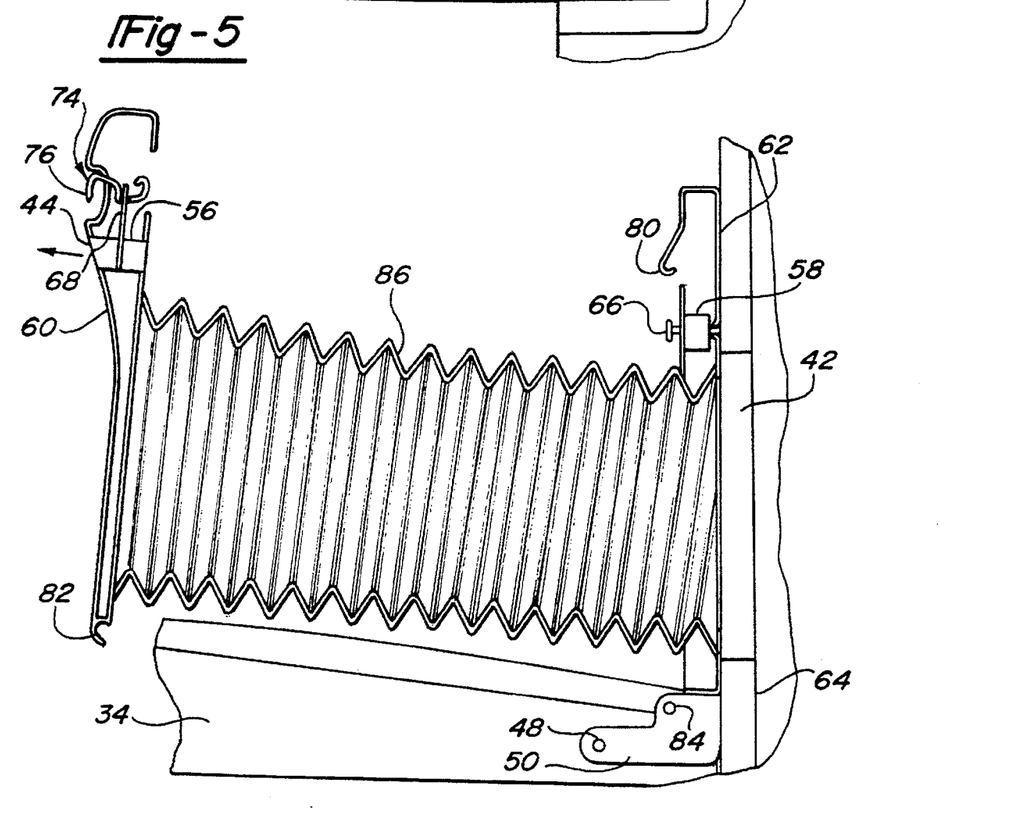
FIG. 5 is a sectional view of the rear wall illustrating the ski tote bag in an expanded position.

The rear wall 38 is constructed of a front panel 60 and rear panel 62 (FIGS. 4 and 5). The rear panel 62 is fixed to the brackets 50 on each side of the armrest for rotation about the pivot 48. The front panel is removably attached to the rear panel. The front panel, at its lower end, has a hook 82 on each side which seats upon a pin 84 on each side of the rear panel. The hooks 82 can only be removed from the pins 84 by upward and forward movement of the front panel.

A latch 67 at the upper end of the front panel couples the front and rear panels to one another. The latch 67 prevents the upward movement necessary for the front panel to be raised off the pins 84. The latch 67 includes a latch handle 74 and a latch plate 68. The latch plate 68 has a circumferential slot 70 which terminates at one end in a radial slot 72. The latch handle 74 passes through the circumferential slot 70 in the latch plate and has a grip portion 76 and a rear latch hook 78. The latch hook 78 engages a hook 80 formed in the rear panel 62. When the latch plate 68 is rotated counter-clockwise as shown by the arrow 54, the latch handle 74 is moved to the end of the circumferential slot and is enabled to move radially through the radial slot 72. In this position, the handle 74 can be pulled to disengage the latch handle from the hook 80, thus freeing the front panel of the rear wall. However, the latch plate can only be rotated by operation of the lock with its key.

Rotation of the lock 44 in a counter-clockwise direction, as shown by the arrow 54 in FIG. 3, results in a release of the front portion 56 of the lock 44 from the rear portion 58 of the lock 44. The lock rear portion 58 remains attached to the striker 46. This release of the lock enables a front panel 60 of the rear wall to separate from a rear panel 62. The rear panel remains attached to the armrest module by the rear portion of the lock. The front portion 56 of the lock couples to an internal lock striker 66 to hold the front and rear panels of the rear wall together.

A tote bag 86 designed to fold in an accordion-style fashion is disposed between the front and rear panels of the rear wall. The tote bag expands from its folded position to an extended position as shown in FIG. 5 and with module 22C in FIG. 1. The bag is expanded when the front panel 60 is moved forward into the passenger compartment of the vehicle body. Elongated articles such as skis can be inserted from the trunk into the bag, enabling long objects to be stored within the vehicle trunk. The bag 86 has a generally rectangular cross-sectional shape and is fitted to the rear panel 62 generally about the opening 42 in the rear of the armrest module and about the passage 24 in the seat back. At its front end, the tote bag 86 is attached to the front panel 60. The bag and front panel provide an enclosed space for skis or other elongated objects. The bag prevents snow, dirt or other debris on the skis from soiling the upholstery of the rear seat. The bag may be made out of nylon or other durable and washable material. The accordion-style folding of the tote bag enables the bag to be easily compressed to a small volume for storage between the front and rear panels when they are latched together.

Figure 6:
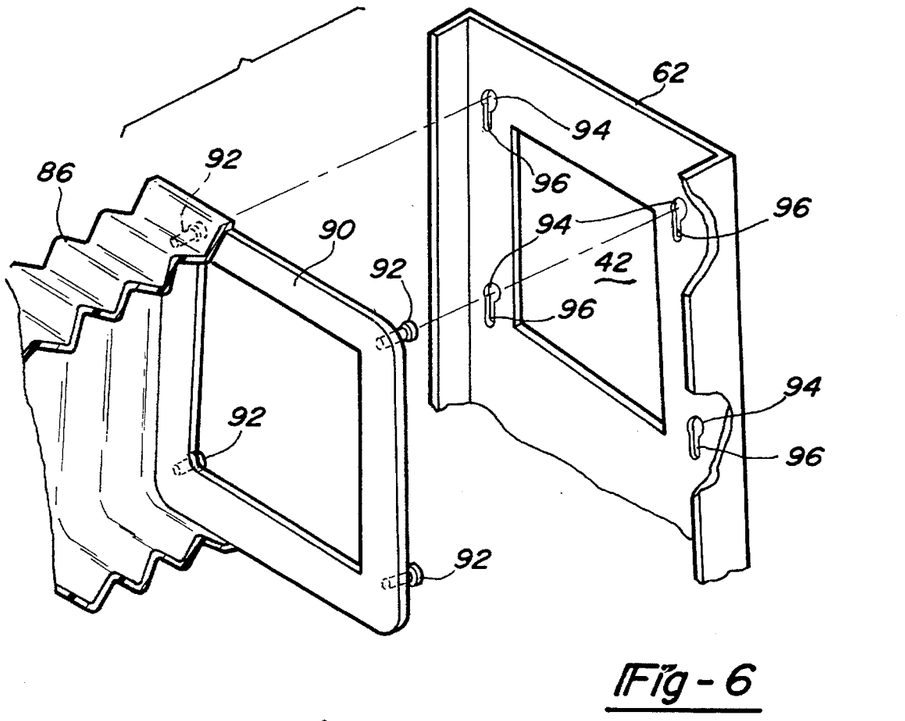
FIG. 6 is an exploded perspective view illustrating the removable attachment of the rear end of the tote bag.

The bag 86 is removably mounted to the rear panel 62 and also to the front panel 60 for removal of the bag for cleaning and other purposes. One embodiment for removably mounting the bag to the rear panel 62 is shown in FIG. 6. There the bag 86 is integrally formed or otherwise fixed to a rectangular frame 90 at the rear end of the bag. The frame 90 is generally rectangular or square and sized to fit about the opening 42 in the module 22. The frame 90 has a plurality of rearwardly extending mushroom shaped mounting studs 92. The enlarged heads of the mushroom shaped studs fit into key slots 94 formed in the rear panel 62. The enlarged heads are inserted through the enlarged circular portions of the key slots 94 after which the frame 90 is moved downward, moving the mounting studs into the narrower lower portions 96 of the key slots.

Figure 7:
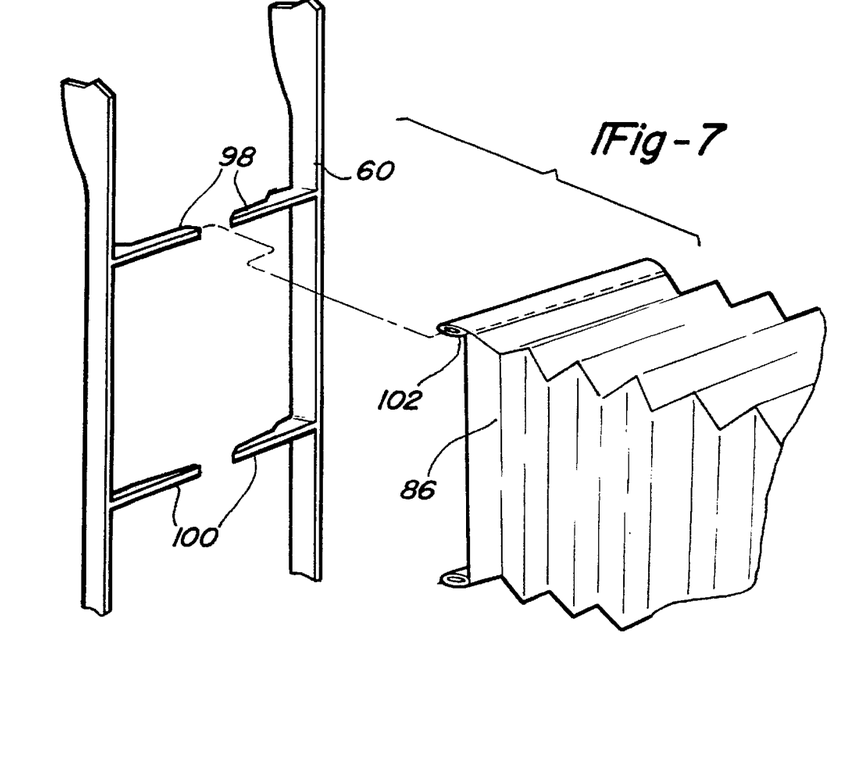
FIG. 7 is an exploded perspective view illustrating the removable attachment of the front end of the tote bag.

At the front end of the bag 86, the bag is also removably mounted to the front panel 60. The front panel is shown formed with horizontal upper fingers 98 and horizontal lower fingers 100 both extending laterally inward toward one another. The front end of the bag 86 is formed with a lateral pocket 102 at both the top and the bottom of the bag. The bag is manipulated so as to insert the fingers 98, 100 into the upper and lower pockets 102 at the front of the bag.

Thus, when the front panel 60 is moved forward from the rear panel, the front end of the bag will move forward with the panel 60.

Other means of attachment can be utilized at both the front and rear of the bag such as VELCRO hook and loop type fasteners, snaps, zippers, interlocking strip fasteners, beads inserted into resilient grooves, etc.

Figure 8:
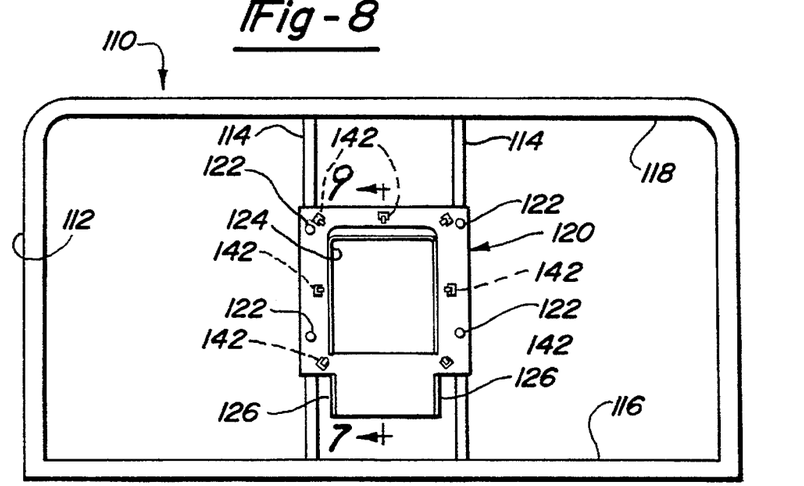
FIG. 8 is a front view of the seat back support structure of an alternate embodiment of the seat back with ski tote bag.

Another embodiment of the seat back having a removable ski tote bag is shown in FIGS. 8–11. FIG. 8 is a front view of the seat back support frame 110 which is adapted to be mounted into the vehicle body and which supports the foam body or bodies such as those described above in connection with the previous embodiment. The support frame 110 includes a generally rectangular frame member 112 which extends about the perimeter of the seat back. A pair of upright columns 114 extend upwardly between a lower cross member 116 and an upper cross member 118 of the frame member 112.

A tote bag frame member 120 is attached to the upright columns 114 by a plurality of bolts 122 or other fasteners. The tote bag frame member 120 has a central opening 124 which forms the passage way through the seat back between the trunk and passenger compartment of the vehicle body to which the seat back is installed.

The tote bag frame member 120, at its lower end, has a pair of forward facing mounting flanges 126. The flanges 126 have apertures 128 defining a pivot axis for mounting of the armrest 34.

Figures 9, 10, 11:
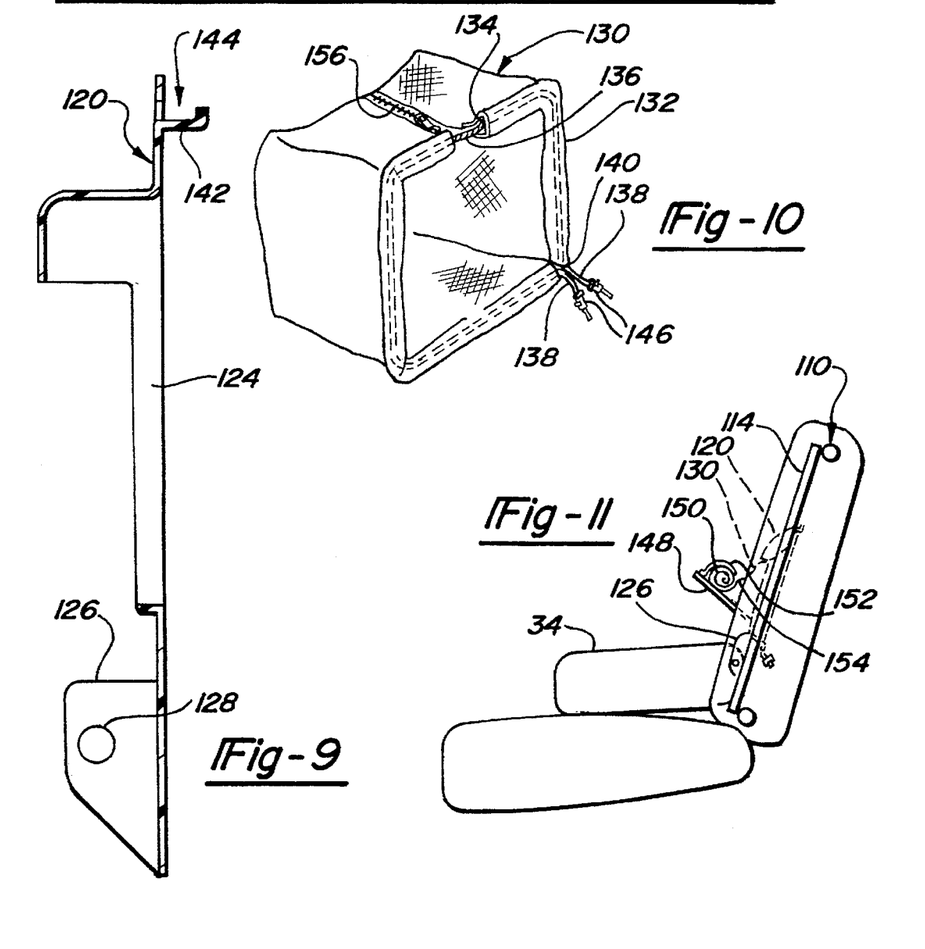
FIG. 9 is sectional view of the frame member forming the opening through the seat back structure as seen from substantially the line 9—9 of FIG. 8.
FIG. 10 is a perspective view of the open end of the tote bag illustrating a drawstring for use in attaching the tote bag to the seat back.
FIG. 11 is a side elevational view of the rear seat with the armrest folded forward and rear door partially open illustrating the tote bag in a stowed position attached to the rear of the door.

A ski tote bag 130 shown in FIG. 10 is attached to the frame member 120 about the perimeter of the opening 124. The bag 130 has an open rear end 132. The bag is formed with a pocket 134 about the rear end. The pocket contains a drawstring 136 having ends 138 extending from the pocket at a lower corner 140 of the bag. Extending rearward from the frame member 120, spaced about the opening 124, are a plurality of spaced hooks 142. The hooks 142 are curved away from the opening 124 forming a bight 144. The hooks 142 cooperate with one another to define a groove about the perimeter of the opening 124. The drawstring 136 is seated within the groove and is pulled tight against the hooks 142. Each of the drawstring ends 136 contain a spring clasp 146 which can be adjusted to bear against the open end of the pocket 134 and hold the drawstrings in a tightened position within the groove formed by the hooks.

Other attachments can be used in place of the drawstring. Elastic can be used in place of the drawstring for attachment about the hooks 142. Alternatively, the hooks could be replaced with mounting studs with enlarged heads and the bag open end provided with button holes for mounting on the studs. VELCRO hook and loop fasteners, snaps, zippers, mating strip fasteners, and an elongated bead inserted in a groove are other options for attaching the bag.

A door 148 is also pivotally attached to the tote bag frame member 120 near the pivot of the armrest 34. The door 148 is shown in FIG. 11 midway between a closed position closing the opening 124 and an open position resting on top of the armrest 34. The bag 130 is stored by rolling the bag in a spiral like a sleeping bag, forming a roll 150. The roll 150 is attached to the rear side of the door 148 by a strap 152. The strap 152 is attached to the rear side of the door adjacent the upper end of the door. When the bag is rolled into the roll 150, the strap end will attach to the bag by a snap or a VELCRO fastener 154 holding the bag to the door and holding the bag in the roll 150.

Use of the bag is accomplished by first folding the armrest 34 to its forward horizontal position, then opening the door 148 to rest on top of the armrest. The strap 152 is then removed and the bag unrolled forward, enabling elongated objects to be inserted from the trunk into the open end of the bag and into the passenger compartment of the vehicle. Should the bag need to be removed for cleaning, the spring clasps 146 are released, allowing the drawstring to be removed from the hooks 142 and the bag removed from the seat back. The bag is preferably made with a zipper 156 to provide access into the bag from the interior of the vehicle. By opening the zipper 156, the drawstring ends can be reached from within the vehicle, avoiding the need to reach through the vehicle trunk to operate the drawstring clasps. Snaps, VELCRO, etc. can be used in place of a zipper 156 to provide the opening into the bag.

The present invention provides for convenient storage of skis within a trunk and rear passenger area of a motor vehicle. At the same time, a pass through between the trunk and the passenger compartment is provided. The tote bag can be removed from the seat back to provide the pass through without interference from the bag. In one embodiment, the bag is contained within a separate door which is movable away from the passageway to provide the pass through.

One embodiment of the invention has been described in the context of a removable armrest module 22. It is to be understood that the invention need not be contained within a removable module but could be a non-removable, permanent feature of the seat back 14.

It is to be understood that the invention is not limited to the exact construction illustrated and described above, but that various changes and modifications may be made without departing from the spirit and scope of the invention as defined in the following claims.

We claim:

1. A seat back adapted to be installed in a motor vehicle body having a passenger compartment and a trunk behind the passenger compartment with said seat back being disposed between and separating the passenger compartment from the trunk, said seat back comprising:

at least one foam body forming a cushion having a front seating surface against which a vehicle occupant can rest his or her torso;

a generally upright support structure immediately behind said cushion for supporting said cushion, said support structure being adapted to be attached to the vehicle body;

an opening extending through said support structure and an opening extending through said cushion forward of said support structure opening forming a passageway between the passenger compartment and the trunk of the vehicle in which said seat back is installed, said passageway having a perimeter;

enclosure means for enclosing an object inserted through said passageway from the vehicle trunk into the vehicle passenger compartment, said enclosure means including a flexible and extendable bag having an open end mounted at said perimeter of said passageway and a closed end extendable forward of said cushion; and mounting means for removably mounting said bag about said perimeter of said passageway said mounting means including a drawstring in said bag at said open end thereof, means extending about said perimeter of said passageway forming a groove for receiving said drawstring in which said drawstring can be drawn tight to mount said bag and means on said drawstring for retaining said drawstring in the tightened position whereby said bag can be selectively removed from said seat back to enable an object to extend though said passageway which is larger than said bag.

2. The seat back of claim 1 further comprising an armrest cushion having a stowed position within said opening in said cushion forward of said enclosure means in which said armrest forms a portion of said seating surface, said armrest cushion being movable from said stowed position to a forward extending use position revealing said passageway.

3. The seat back of claim 2 further comprising a panel closing said passageway between said armrest cushion and said enclosure means.

4. The seat back of claim 3 further comprising lock means for locking said panel in said passageway to prevent unauthorized access through said passageway.

5. The seat back of claim 1 wherein said bag folds in an accordion-style fashion whereby said bag can be repeatedly extended forward of said cushion and contracted back into said passageway in a controlled and predictable manner for storage.

6. The seat back of claim 1 wherein said at least one foam pad forming said cushion is pad of a removable module mounted to said support structure which can be removed and replaced with another module.

7. A seat back adapted to be installed in a motor vehicle body having a passenger compartment and a trunk behind the passenger compartment with said seat back being disposed between and separating the passenger compartment from the trunk, said seat back comprising:

at least one foam body forming a cushion having a front seating surface against which a vehicle occupant can rest his or her torso;

a generally upright support structure immediately behind said cushion for supporting said cushion, said support structure being adapted to be installed within the vehicle body;

said foam body and said support structure having an opening therethrough forming a passageway between the passenger compartment and the trunk of the vehicle in which said seat back is installed, said passageway having a perimeter;

an armrest having a stowed position within said opening in said foam body closing said passageway in which said armrest forms a portion of said seat back seating surface, said armrest being movable from said stowed position to a forward extending use position opening said passageway;

a wall disposed in said passageway behind said armrest, said wall being pivotally mounted to said support structure for rotation about a transverse axis at a lower end of said passageway, said wall being rotatable about said axis between a closed position in said passageway and an open position extending forward from said cushion to open said passageway into the trunk; and an extendable bag mounted to said wall having an open end mounted about said perimeter of said passageway, said bag being extendable forward from said cushion when said wall is in said closed position to enclose and surround an elongated object inserted through said passageway from the vehicle trunk into the vehicle passenger compartment whereby the elongated object is separated from the passenger compartment of the vehicle.

8. The seat back of claim 7 further comprising lock means for locking said wall in said closed position to prevent unauthorized access through said passageway.

9. The seat back of claim 8 wherein said wall has front and rear panels movable relative to one another, said rear panel being retained to said support structure by said lock means, and said wall further comprising latch means for latching said front panel to said rear panel, said rear panel including an opening therein which is covered by said front panel; and said flexible and extendable bag being attached to said rear panel around said opening therein and extending to said front panel whereby said bag is extendable forward from said rear panel by moving said front panel forward.

10. The seat back of claim 9 wherein said bag folds in an accordion-style fashion whereby said bag can be repeatedly extended and contracted between said front and rear panels in a controlled and predictable manner for storage between said front and rear panels.

11. The seat back of claim 9 further comprising means for coupling said latch means to said lock means for preventing release of said front panel from said rear panel without first releasing said lock means.

12. The seat back of claim 11 wherein said lock means releases said rear wall upon rotation of said lock means in one direction and releases said latch means to separate said front and rear panels upon rotation of said lock means in the opposite direction.

13. The seat back of claim 9 wherein said bag is removably mounted to said front and rear panels whereby said bag can be removed for cleaning.

14. The seat back of claim 7 wherein said armrest and said rear wall pivot about a common pivot axis.

15. The seat back of claim 7 wherein said bag is removably mounted to said wall whereby said bag can be removed for cleaning.

16. A seat back adapted to be installed in a motor vehicle body having a passenger compartment and a trunk behind the passenger compartment with said seat back being disposed between and separating the passenger compartment from the trunk, said seat back comprising:

at least one foam body forming a cushion having a front seating surface against which a vehicle occupant can rest his or her torso;

a generally upright support structure immediately behind said cushion for supporting said cushion, said support structure being adapted to be installed within the vehicle body;

an opening extending through said support structure and an opening extending through said cushion forward of said support structure opening forming a passageway between the passenger compartment and the trunk of the vehicle in which said seat back is installed, said passageway having a perimeter;

a flexible and extendable bag having an open end mounted at said perimeter of said passageway and a closed end extendable forward of said cushion to enclose and surround an object inserted through said passageway from the vehicle trunk into the vehicle passenger compartment, the bag having an opening therein to enable access to the interior of said bag from within the vehicle passenger compartment and a closure for closing said opening in said bag; and mounting means for removably mounting said open end of said bag to said support structure about said perimeter of said passageway whereby said enclosure means can be selectively removed from said seat back to enable an object to extend though said passageway which is larger than said bag.

17. The seat back of claim 16 wherein said mounting means includes a pocket in said bag extending about said open end thereof, a drawstring extending through said pocket;

said support structure having means extending about said perimeter of said passageway forming a groove for receiving said drawstring in which said drawstring can be drawn tight to mount said bag to said support structure; and means on said drawstring for retaining said drawstring in the tightened position in said groove.

18. The seat back of claim 17 wherein said means forming said groove include a plurality of hooks spaced about said perimeter of said passageway and curving away from said passageway, the bight of said hooks defining said groove for reception of said drawstring therein.

* * * * *